US006611270B1

(12) United States Patent
Hosotani

(10) Patent No.: US 6,611,270 B1
(45) Date of Patent: Aug. 26, 2003

(54) MICROCOMPUTER HAVING ON-SCREEN DISPLAY

(75) Inventor: Osamu Hosotani, Hyogo (JP)

(73) Assignees: Mitsubishi Denki Kabushiki Kaisha, Tokyo (JP); Mitsubishi Electric System LSI Design Corporation, Itami (JP)

( * ) Notice: Subject to any disclaimer, the term of this patent is extended or adjusted under 35 U.S.C. 154(b) by 361 days.

(21) Appl. No.: 09/587,884

(22) Filed: Jun. 7, 2000

(30) Foreign Application Priority Data

Dec. 13, 1999 (JP) ........................................ 11-353607

(51) Int. Cl.[7] ................................................ G06T 1/60

(52) U.S. Cl. ...................... 345/530; 345/716; 345/520

(58) Field of Search ........................ 345/520, 531–536, 345/541, 716, 561

(56) References Cited

U.S. PATENT DOCUMENTS 4,688,032 A * 8/1987 Saito et al. ................ 345/565
5,450,542 A * 9/1995 Lehman et al. ............ 345/542
5,712,664 A * 1/1998 Reddy ........................ 345/519
5,774,189 A * 6/1998 Ishii et al. ................. 348/563
6,070,205 A * 5/2000 Kato et al. .................. 710/100
6,323,866 B1 * 11/2001 Chen et al. ................ 345/519

* cited by examiner

*Primary Examiner*—Joseph Mancuso
*Assistant Examiner*—Antonio Caschera
(74) *Attorney, Agent, or Firm*—Burns, Doane, Swecker & Mathis, LLP

(57) ABSTRACT

A CPU outputs address data indicating a data storing unit or an OSD-RAM to access the data storing unit or the OSD-RAM, and an OSD logical circuit sometimes accesses the OSD-RAM to display data on an on-screen display. The address data is decoded in an OSD-RAM address decoder, and a decoded signal of “0” or “1” is output to an OR gate. Also, a value “0” normally set in a 1-wait register is output to the OR gate. When the address data indicates the data storing unit, a value “0” is output from the OR gate to a bus interface unit (BIU), an access mode of the CPU is set to a no-wait access mode corresponding to a shortest cycle, and the CPU accesses the data storing unit at the no-wait access mode. In contrast, when the address data indicates the OSD-RAM, a value “1” is output from the OR gate to the BIU, an access mode of the CPU is set to a 1-wait access mode corresponding to a double cycle, and the CPU accesses the OSD-RAM in the first half of the double cycle. When the accessing of the OSD logical circuit to the OSD-RAM is performed simultaneously with the accessing of the CPU to the OSD-RAM, the OSD logical circuit accesses the OSD-RAM in the second half of the double cycle. Therefore, software processing efficiency can be improved.

10 Claims, 11 Drawing Sheets

MICROCOMPUTER HAVING ON-SCREEN DISPLAY

BACKGROUND OF THE INVENTION

1. Field of the Invention

The present invention relates to a microcomputer having an on-screen display in which a processing time required for a central processing unit is shortened to improve a software processing efficiency.

2. Description of Related Art

FIG. 11 is a block diagram showing the configuration of a conventional microcomputer having an on-screen display.

As shown in FIG. 11, a reference numeral 113 indicates a data storing unit including a read only memory (ROM) and a random access memory (RAM), and data used in the conventional microcomputer is stored in the data storing unit 113. A reference numeral 114 indicates an on-screen display (OSD) RAM, and display data to be displayed on a cathode ray tube (CRT and not shown) is stored in the OSD-RAM 114.

A reference numeral 111 indicates a central processing unit (CPU), and the conventional microcomputer is controlled by the CPU 111. The accessing of the CPU 111 to the data storing unit 113 or the accessing of the CPU 111 to the OSD-RAM 114 is performed according to a data read/write request of the CPU 111 to perform a data reading or writing from/to the data storing unit 113 or to perform a display data writing to the OSD-RAM 114. A reference numeral 115 indicates a 1-wait register, and an access mode value "0" indicating a no-wait access mode or an access mode value "1" indicating a 1-wait access mode is stored in the 1-wait register 115 according to an access mode instruction transmitted from the CPU 111.

A reference numeral 112 indicates a bus interface unit (BIU). The BIU 112 controls the data read/write request transmitted from the CPU 111 to be transmitted to the data storing unit 113 or the OSD-RAM 114. Also, the BIU 112 sets an access mode (for example, the no-wait access mode denoting a shortest access cycle or the 1-wait access mode denoting a double access cycle) of the conventional microcomputer according to the access mode value of the 1-wait register 115 to transmit the data read/write request of the CPU 111 to the data storing unit 113 or the OSD-RAM 114 and to make the CPU 111 access to the data storing unit 113 or the OSD-RAM 114 at the access mode.

A reference numeral 116 indicates an OSD logical circuit. An OSD-RAM read request signal S2 of the OSD logical circuit 116 is transmitted to the OSD-RAM 114 to access to the OSD-RAM 114 at the access mode set by the BIU 112 to read out the display data stored in the OSD-RAM 114.

A reference numeral 118 indicates a change-over switch, and a connection between the CPU 111 and the OSD-RAM 114 or a connection between the OSD logical circuit 116 and the OSD-RAM 114 is selected by the change-over switch 118 according to the data read/write request of the CPU 111 or the OSD-RAM read request signal S2 of the OSD logical circuit 116.

A reference numeral 117 indicates an address/data bus, and data read out or written from/in the data storing unit 113, the data read/write request of the CPU 111 and the access mode value requested by the CPU 111 transmit through the address/data bus 117.

An on-screen display of the conventional microcomputer is composed of the OSD-RAM 114, the OSD logical circuit 116 and the change-over switch 118.

In the above configuration, an operation of the conventional microcomputer is described.

FIG. 12 is a timing chart of signals used in the operation of the conventional microcomputer having the on-screen display.

When an access mode instruction is transmitted from the CPU 111 to the 1-wait register 115 through the BIU 112, an access mode value "0" or an access mode value "1" is stored in the 1-wait register 115 under control of the BIU 112, and an access mode of the conventional microcomputer is set by the BIU 112 according to a 1-wait signal Sw transmitted from the 1-wait register 115. In cases where the access mode value "0" is set in the 1-wait register 115, the BIU 112 sets a no-wait access mode denoting a shortest access cycle, so that an access of the CPU 111 to the ROM-RAM 113 or the OSD-RAM 114 is performed at the shortest access cycle. That is, no wait time is required of the CPU 111. In contrast, in cases where the access mode value "1" is set in the 1-wait register 115, the BIU 112 sets a 1-wait access mode denoting a double access cycle, so that an access of the CPU 111 to the ROM-RAM 113 or the OSD-RAM 114 is performed at the double access cycle which is two times of the shortest access cycle.

Thereafter, when a data read/write request is transmitted from the CPU 111 to the data storing unit 113 under control of the BIU 112, the accessing of the CPU 111 to the data storing unit 113 is performed at the access mode set by the BIU 112. Also, when a data read/write request is transmitted from the CPU 111 to the change-over switch 118 under control of the BIU 112, the change-over switch 118 connects the CPU 111 with the OSD-RAM 114, and the accessing of the CPU 111 to the OSD-RAM 114 is performed at the access mode set by the BIU 112.

Also, when an OSD-RAM read request signal S2 is transmitted from the OSD logical circuit 116 to the change-over switch 118 in synchronization with vertical and horizontal synchronization signals transmitted from the outside at a time that an CRT of the on-screen display is operated, the change-over switch 118 connects the OSD logical circuit 116 with the OSD-RAM 114, the accessing of the OSD logical circuit 116 to the OSD-RAM 114 is performed at the access mode set by the BIU 112, and the display data of the OSD-RAM 114 is read out to the OSD logical circuit 116. Therefore, a display signal is produced in the OSD logical circuit 116 according to the display data, and the display signal is transmitted to the CRT in synchronization with the vertical and horizontal synchronization signals.

However, in cases where the OSD logical circuit 116 accesses to the OSD-RAM 114 when the CPU 111 accesses to the OSD-RAM 114 at the no-wait access mode, because the CPU 111 and the OSD logical circuit 116 cannot simultaneously access to the OSD-RAM 114, there is a problem that a wrong operation is performed in the conventional microcomputer.

To avoid this problem in the conventional microcomputer, the access mode value "1" indicating the 1-wait access mode is set in the 1-wait register 115 during the operation of the on-screen display, and the CPU 111 and the OSD logical circuit 116 access to the OSD-RAM 114 in time-division at the double access cycle. For example, as shown in FIG. 12, when the operation of the on-screen display is started at a time T100, the access mode value "1" is set in the 1-wait register 115 to transmit a 1-wait signal Sw of a high level to the BIU 112, and the conventional microcomputer is set to the 1-wait access mode. Thereafter, in cases where the accessing of the CPU 111 to the OSD-RAM 114 and the accessing of the OSD logical circuit 116 to the OSD-RAM 114 are simultaneously performed in a time-period T100 of one double access cycle by transmitting a CPU access address of the data read/write request indicating the OSD-RAM 114 and an OSD-RAM read request signal S2 of the OSD logical circuit 116 to the change-over switch 118, the CPU 111 accesses to the OSD-RAM 114 during a first half time-period T121 of the time-period T100, and the OSD logical circuit 116 accesses to the OSD-RAM 114 during a second half time-period T122 of the time-period T100.

However, because the conventional microcomputer is set to the 1-wait access mode during the operation of the on-screen display, a time-period of each access of the CPU 111 to the data storing unit 113 or the OSD-RAM 114 is doubled to two clocks of a system clock signal during the operation of the on-screen display as compared with that at the no-wait access mode. For example, when the CPU 111 accesses to the data storing unit 113 during the operation of the on-screen display, the accessing of the CPU 111 is performed at the 1-wait access mode. Therefore, there is a drawback that a memory processing speed of the CPU 111 is lowered to half during the operation of the on-screen display so as to lower a software processing efficiency.

SUMMARY OF THE INVENTION

An object of the present invention is to provide, with due consideration to the drawback of the conventional microcomputer having the on-screen display, a microcomputer having an on-screen display in which a software processing efficiency is improved while allowing the simultaneous accessing of a CPU and an OSD logical circuit to an OSD-RAM.

The object is achieved by the provision of a microcomputer having an on-screen display, comprising:

a first register for registering an access mode value indicating a first access mode corresponding to a first bus cycle or a second access mode corresponding to a second bus cycle longer than the first bus cycle;

a first storing circuit for storing first data;

a display data storing circuit for storing display data;

a first control unit for outputting address data of the first storing circuit or address data of the display data storing circuit to access to the first storing circuit or the display data storing circuit and to process the first data or the display data;

an address decoder for decoding the address data output by the first control unit to identify whether the address data indicates the first storing circuit or the display data storing circuit, outputting a first address value in cases where the address data indicates the first storing circuit, and outputting a second address value in cases where the address data indicates the display data storing circuit;

a first logical circuit, connected with the first register and the address decoder, for producing a first logical value indicating the second access mode in cases where the first register registers the access mode value indicating the first access mode and the second address value indicating the display data storing circuit is output by the address decoder;

a picture display logical circuit for accessing to the display data storing circuit to display the display data stored in the display data storing circuit on the on-screen display; and a bus interface unit for receiving the first logical value from the first logical circuit, setting the access mode of the first control unit to the second access mode according to the first logical value to make the first control unit access to the display data storing circuit in a first half of the second bus cycle and to make the picture display logical circuit access to the display data storing circuit in a second half of the second bus cycle.

In cases where the first control unit accesses to the first storing circuit to read out or write first data from/to the first storing circuit, the first control unit can sufficiently access to the first storing circuit at the first access mode. In contrast, in cases where the first control unit accesses to the display data storing circuit to write display data to the display data storing circuit, there is a case that the picture display logical circuit accesses to the display data storing circuit simultaneously with the accessing of the first control unit to the display data storing circuit. Therefore, assuming that the first control unit accesses to the display data storing circuit at the first access mode, because the first control unit and the picture display logical circuit cannot simultaneously access to the display data storing circuit in a time-period of the first bus cycle corresponding to the first access mode, a wrong operation is performed by the microcomputer in cases where the picture display logical circuit accesses to the display data storing circuit simultaneously with the accessing of the first control unit to the display data storing circuit.

In the above configuration of the present invention, in cases where the first control unit desires to access to the display data storing circuit, the access mode is set to the second access mode by the bus interface unit, and the first control unit accesses to the display data storing circuit in a time-period of one second bus cycle longer than that of the first bus cycle. Therefore, even though the picture display logical circuit desires to access to the display data storing circuit simultaneously with the accessing of the first control unit to the display data storing circuit, the picture display logical circuit can access to the display data storing circuit, in the time-period of the second bus cycle, simultaneously with the accessing of the first control unit to the display data storing circuit.

Accordingly, because the access mode is set to the second access mode in an only case where the first control unit accesses to the display data storing circuit, and because the access mode is set to the first access mode in cases where the first control unit accesses to the first storing circuit, an wrong operation of the microcomputer based on the simultaneous accessing of the first control unit and the picture display logical circuit to the display data storing circuit can be prevented, a time-period of each accessing of the first control unit to the first storing circuit can be shortened to the time-period of the first bus cycle, and a software processing efficiency can be improved.

It is preferred that the picture display logical circuit comprises a second register for registering a display condition value indicating a display active condition or a display condition value indicating a display non-active condition, the microcomputer further comprises a second logical circuit for receiving the first address value or the second address data from the address decoder, receiving the display condition value from the second register, performing a logical calculation according to the first address value or the second address data and the display condition value, producing a second logical value from the first address value or the second address data and the display condition value, and outputting the second logical value to the first logical circuit, the second logical circuit outputs the second logical value by receiving the second address value indicating the display data storing circuit from the address decoder and receiving the display condition value indicating the display active condition from the second register, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access to the display data storing circuit in the first half of the second bus cycle and to make the picture display logical circuit access to the display data storing circuit in the second half of the second bus cycle.

In the above configuration, in cases where the picture display logical circuit is set to the display non-active condition, even though the first control unit outputs the address data of the display data storing circuit, because the accessing of the picture display logical circuit to the display data storing circuit is not performed in the display non-active condition, the bus interface unit sets the access mode of the first control unit to the first access mode.

In contrast, in cases where the picture display logical circuit is set to the display active condition, there is a case that the accessing of the picture display logical circuit to the display data storing circuit is performed in the display active condition. Therefore, the bus interface unit sets the access mode of the first control unit to the second access mode according to the first logical value and the second logical value in case of the accessing of the first control unit to the display data storing circuit.

Accordingly, a time-period of each accessing of the first control unit to the first storing circuit can be moreover shortened to the time-period of the first bus cycle while preventing an wrong operation of the microcomputer based on the simultaneous accessing of the first control unit and the picture display logical circuit to the display data storing circuit, and a software processing efficiency can be moreover improved.

It is also preferred that the picture display logical circuit comprises a second register for registering a display condition value indicating a display active condition or a display condition value indicating a display non-active condition; and a block active signal producing circuit, connected with the second register, for producing a block active signal indicating a block display time-period in the on-screen display in cases where the display condition value indicating the display active condition is registered in the second register, the microcomputer further comprises a second logical circuit for receiving the first address value or the second address data from the address decoder, receiving the block active signal from the block active signal producing circuit, performing a logical calculation according to the first address value or the second address data and the block active signal, producing a second logical value from the first address value or the second address data and the block active signal, and outputting the second logical value to the first logical circuit, the second logical circuit outputs the second logical value by receiving the second address value indicating the display data storing circuit from the address decoder and receiving the block active signal indicating the block display time-period from the block active signal producing circuit, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access to the display data storing circuit in the first half of the second bus cycle of the block display time-period and to make the picture display logical circuit access to the display data storing circuit in the second half of the second bus cycle of the block display time-period.

In the above configuration, in cases where the picture display logical circuit is set to the display non-active condition, even though the first control unit outputs the address data of the display data storing circuit, because the accessing of the picture display logical circuit to the display data storing circuit is not performed in the display non-active condition, the bus interface unit sets the access mode of the first control unit to the first access mode.

In contrast, in cases where the picture display logical circuit is set to the display active condition, there is a case that the accessing of the picture display logical circuit to the display data storing circuit is performed in a block display time-period of the display data. The block display time-period is indicated by the block active signal produced by the block active signal producing circuit. Therefore, the bus interface unit sets the access mode of the first control unit to the second access mode in the block display time-period according to the first logical value and the second logical value in case of the accessing of the first control unit to the display data storing circuit.

Accordingly, a time-period of each accessing of the first control unit to the first storing circuit can be moreover shortened to the time-period of the first bus cycle while preventing an wrong operation of the microcomputer based on the simultaneous accessing of the first control unit and the picture display logical circuit to the display data storing circuit, and a software processing efficiency can be moreover improved.

It is also preferred that a second logical circuit for receiving the first address value or the second address data from the address decoder, receiving a vertical synchronization signal, performing a logical calculation according to the first address value or the second address data and the vertical synchronization signal, producing a second logical value from the first address value or the second address data and the vertical synchronization signal, and outputting the second logical value to the first logical circuit, the second logical circuit outputs the second logical value by receiving the second address value indicating the display data storing circuit from the address decoder and receiving the display condition value indicating the display active condition from the second register, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access to the display data storing circuit in the first half of the second bus cycle and to make the picture display logical circuit access to the display data storing circuit in the second half of the second bus cycle.

In the above configuration, in cases where the picture display logical circuit is set to a display impossible condition indicated by the vertical synchronization signal, even though the first control unit outputs the address data of the display data storing circuit, because the accessing of the picture display logical circuit to the display data storing circuit is not performed in the display impossible condition, the bus interface unit sets the access mode of the first control unit to the first access mode.

In contrast, in cases where the picture display logical circuit is set to a display possible condition indicated by the vertical synchronization signal, there is a case that the accessing of the picture display logical circuit to the display data storing circuit is performed in the display possible condition. Therefore, the bus interface unit sets the access mode of the first control unit to the second access mode according to the first logical value and the second logical value in case of the accessing of the first control unit to the display data storing circuit.

Accordingly, a time-period of each accessing of the first control unit to the first storing circuit can be moreover shortened to the time-period of the first bus cycle while preventing an wrong operation of the microcomputer based on the simultaneous accessing of the first control unit and the picture display logical circuit to the display data storing circuit, and a software processing efficiency can be moreover improved.

Also, because no active register is required, the microcomputer can be simplified.

It is also preferred that the microcomputer further comprising a change-over switch for connecting the first control unit with the display data storing circuit in the first half of the second bus cycle and connecting the picture display logical circuit with the display data storing circuit in the second half of the second bus cycle according to a request of the display data storing circuit, in cases where the access mode of the first control unit is set to the second access mode by the bus interface unit to which the first logical value is output from the first logical circuit.

In the above configuration, even though the accessing of the first control unit to the display data storing circuit is performed simultaneously with the accessing of the picture display logical circuit to the display data storing circuit, because the change-over switch selects the first control unit and the display data storing circuit in order, the first control unit accesses to the display data storing circuit in the first half of the second bus cycle, and the display data storing circuit accesses to the display data storing circuit in the second half of the second bus cycle.

Accordingly, the simultaneous accessing of both the first control unit and the picture display logical circuit can be reliably performed without any wrong operation of the microcomputer.

It is also preferred that the first logical circuit is an OR gate, and the first logical value indicating the second access mode is "1" indicating a high level.

Therefore, the access mode of the first control unit can be reliably set by the bus interface unit according to the first logical value.

It is also preferred that the first logical circuit is an OR gate, the first logical value indicating the second access mode is "1" indicating a high level, and the second logical circuit is an AND circuit.

Therefore, the access mode of the first control unit can be reliably set by the bus interface unit according to the first and second logical values.

DETAILED DESCRIPTION OF THE PREFERRED EMBODIMENTS

The invention will now be described with reference to the accompanying drawings.

EMBODIMENT 1

Figure 1:
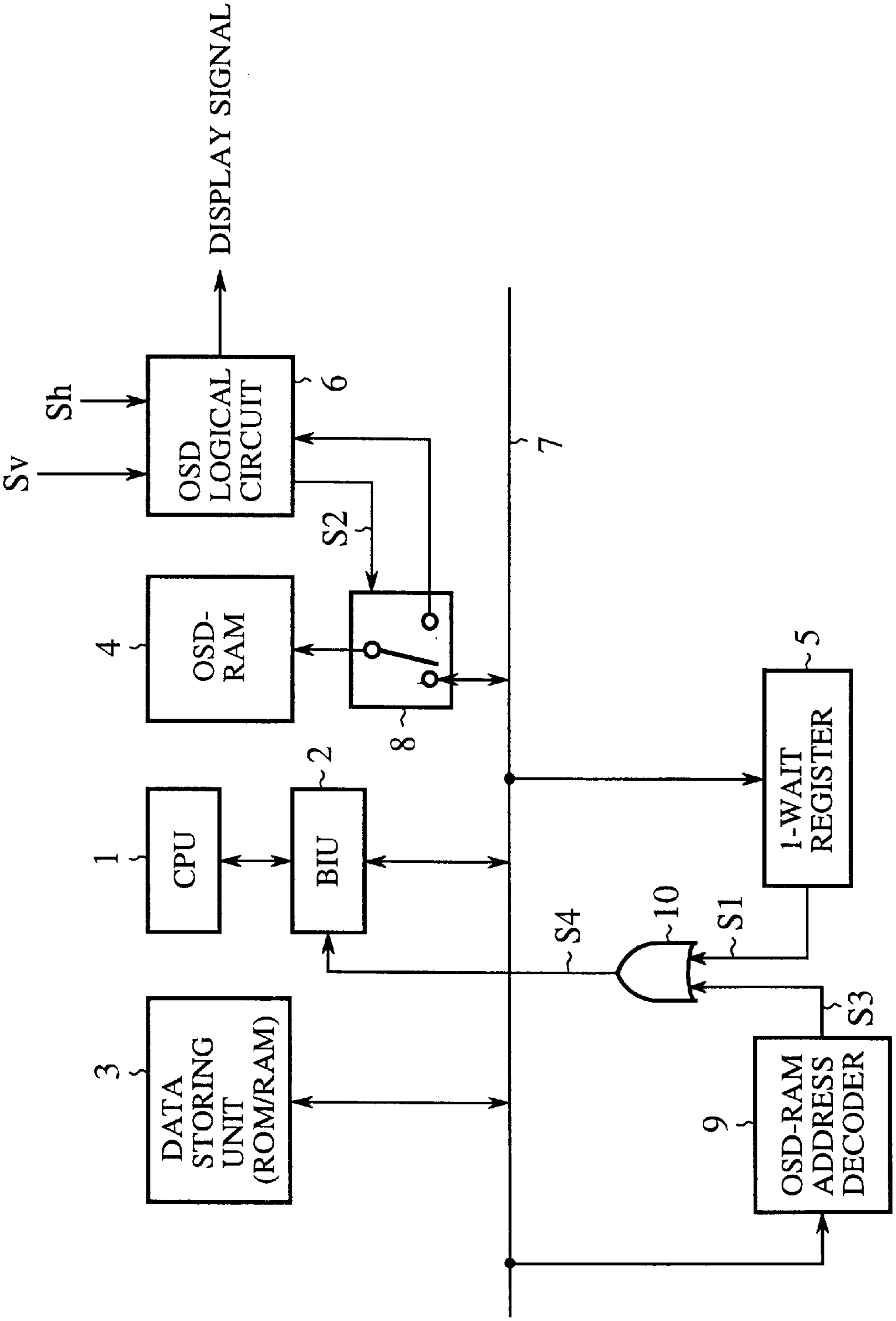
FIG. 1 is a block diagram showing the configuration of a microcomputer having an on-screen display according to a first embodiment of the present invention.

FIG. 1 is a block diagram showing the configuration of a microcomputer having an on-screen display according to a first embodiment of the present invention.

As shown in FIG. 1, a reference numeral 3 indicates a data storing unit (functioning as a first storing circuit) composed of a read only memory (ROM) and a random access memory (RAM), and data used in the microcomputer is stored in the data storing unit 3. A reference numeral 4 indicates an on-screen display (OSD) RAM (functioning as a display data storing circuit), and display data to be displayed on a cathode ray tube (CRT and not shown) is stored in the OSD-RAM 4.

A reference numeral 1 indicates a central processing unit (CPU) functioning as a first control unit, and the microcomputer is controlled by the CPU 1. The CPU 1 outputs a data read/write request including address data of the data storing unit 3 to access to the data storing unit 3 and to perform a data reading or writing from/to the data storing unit 3, or the CPU 1 outputs a data read/write request including address data of the OSD-RAM 4 to access to the OSD-RAM 4 and to perform a display data writing to the OSD-RAM 4.

A reference numeral 5 indicates a 1-wait register (functioning as a first register), and an access mode value "0" indicating a no-wait access mode (or a first access mode) or an access mode value "1" indicating a 1-wait access mode (or a second access mode) is stored in the 1-wait register 5 according to an access mode instruction transmitted from the CPU 1. A 1-wait signal S1 of a low level "0" corresponding to the access mode value "0" or a 1-wait signal S1 of a high level "1" corresponding to the access mode value "1" is output from the 1-wait register 5.

A reference numeral 2 indicates a bus interface unit (BIU). The BIU 2 controls the data read/write request transmitted from the CPU 1 to be transmitted to the data storing unit 3 or the OSD-RAM 4. Also, the BIU 2 specifies an access mode of the microcomputer according to an OR gate output signal S4 to make the CPU 1 access to the data storing unit 3 or the OSD-RAM 4 at the access mode and to transmit the data read/write request of the CPU 1 to the data storing unit 3 or the OSD-RAM 4.

A reference numeral 7 indicates an address/data bus, and data read out or written from/in the data storing unit 3, the data read/write request of the CPU 1 and the access mode value requested by the CPU 1 transmit through the address/data bus 7.

A reference numeral 9 indicates an OSD-RAM address decoder (functioning as an address decoder). The OSD-RAM address decoder 9 decodes the address data of the data read/write request transmitting through the address/data bus 7. In cases where the address data indicates an address of the data storing unit 3, an OSD-RAM address decoded signal S3 of a low level "0" is output from the OSD-RAM address decoder 9. In cases where the address data indicates an address of the OSD-RAM 4, an OSD-RAM address decoded signal S3 of a high level "1" is output from the OSD-RAM address decoder 9.

A reference numeral 10 indicates an OR gate (functioning as a first logical). The OR gate 10 receives the OSD-RAM address decoded signal S3 of the OSD-RAM address decoder 9 and the 1-wait signal S1 of the 1-wait register 5 and performs a well-known OR logic according to the level of the OSD-RAM address decoded signal S3 and the level of the 1-wait signal S1 to produce the OR gate output signal S4. The OR gate output signal S4 is sent to the BIU 2.

A reference numeral 6 indicates an OSD logical circuit (functioning as a picture display logical circuit). An OSD-RAM read request signal S2 of the OSD logical circuit 6 is transmitted to the OSD-RAM 4 to access to the OSD-RAM 4 at the access mode set by the BIU 2 to read out the display data stored in the OSD-RAM 4.

A reference numeral 8 indicates a change-over switch, and a connection between the CPU 1 and the OSD-RAM 4 or a connection between the OSD logical circuit 6 and the OSD-RAM 4 is selected by the change-over switch 8 according to the data read/write request of the CPU 1 or the OSD-RAM read request signal S2 of the OSD logical circuit 6.

An on-screen display of the microcomputer is composed of the OSD-RAM 4, the OSD logical circuit 6 and the change-over switch 8.

In the above configuration, an operation of the microcomputer having the on-screen display is described.

Figure 2:
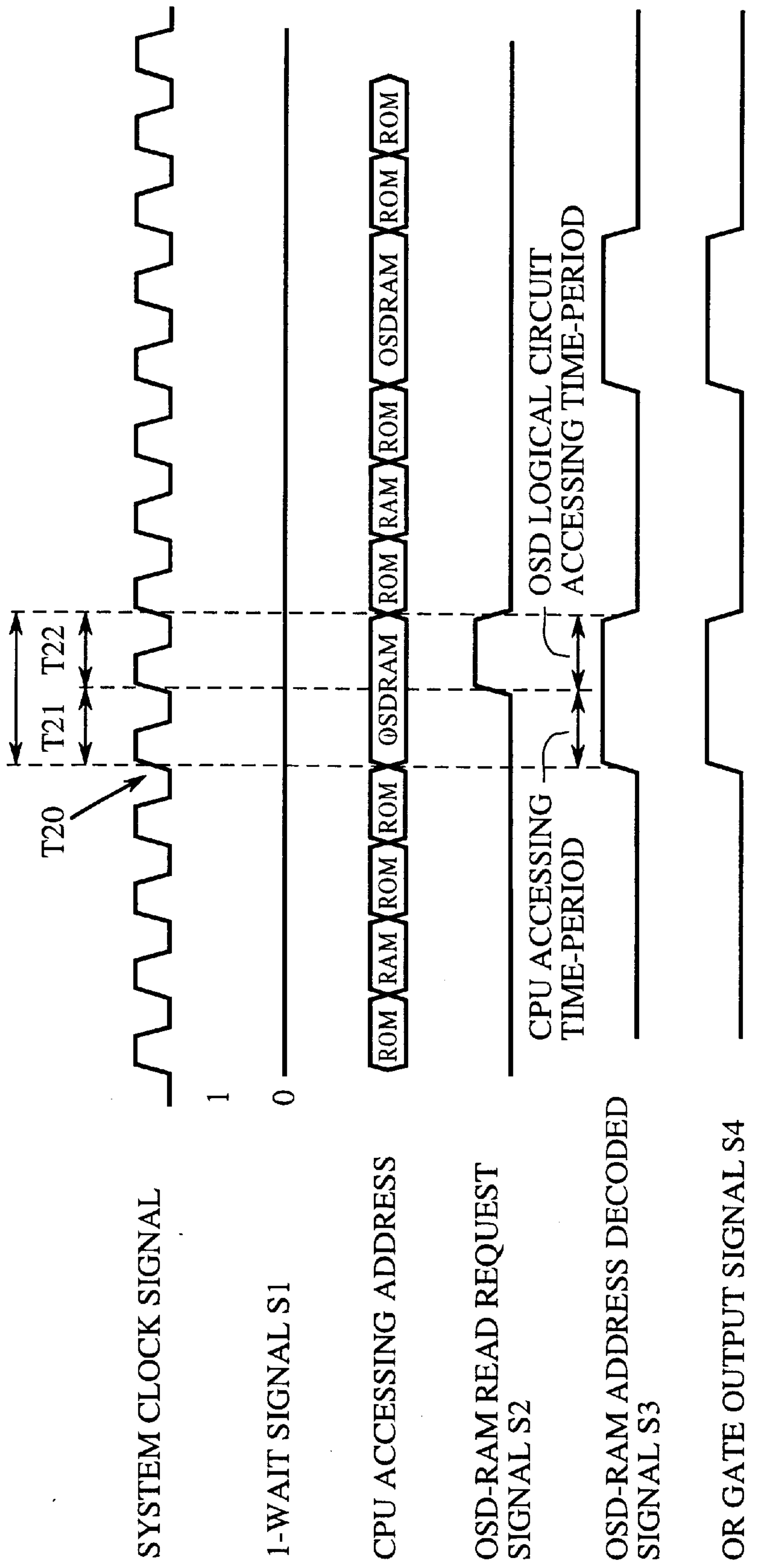
FIG. 2 is a timing chart of signals used in the operation of the microcomputer having the on-screen display shown in FIG. 1.

FIG. 2 is a timing chart of signals used in the operation of the microcomputer having the on-screen display.

When an access mode instruction is transmitted from the CPU 1 to the 1-wait register 5 through the BIU 2, an access mode value "0" or an access mode value "1" is stored in the 1-wait register 5 under control of the BIU 2. The access mode value "0" is normally set in the 1-wait register 5.

A normal case that the access mode value "0" is set in the 1-wait register 5 is described with reference to FIG. 2.

As shown in FIG. 2, in cases where the accessing of the CPU 1 to the data storing unit 3 is desired to perform a data reading or writing from/to the data storing unit 3, an address data indicating the data storing unit 3 (for example, ROM) is sent to the address/data bus 7 by the BIU 2, the address data of the address/data bus 7 is decoded by the OSD-RAM address decoder 9, and an OSD-RAM address decoded signal S3 of a low level "0" is output to the OR gate 10. Because the OR gate also receives a 1-wait signal S1 of a low level "0" from the 1-wait register 5, an OR gate output signal S4 of a low level "0" is produced in the OR gate 10, and the OR gate output signal S4 of the low level "0" is sent to the BIU 2. Therefore, the computer is set to the no-wait access mode by the BIU 2, and the accessing of the CPU 1 to the-data storing unit 3 is performed by the CPU 1 at the no-wait access mode denoting a shortest access cycle (or a first bus cycle). The shortest access cycle corresponds to one clock of a system clock signal.

In contrast, in cases where the accessing of the CPU 1 to the OSD-RAM 4 is desired to perform a writing operation for the OSD-RAM 4, address data indicating the OSD-RAM 4 is sent to the address/data bus 7 by the BIU 2, the address data transmitting through the address/data bus 7 is decoded by the OSD-RAM address decoder 9, and an OSD-RAM address decoded signal S3 of a high level "1" is output to the OR gate 10. Because the OSD-RAM address decoded signal S3 is set to the high level "1", an OR gate output signal S4 of a high level "1" is produced in the OR gate 10, the OR gate output signal S4 of the high level "1" is sent to the BIU 2, and the computer is set to the 1-wait access mode denoting a double access cycle by the BIU 2. Therefore, for example, as shown in FIG. 2, the change-over switch 8 connects the CPU 1 with the OSD-RAM 4 at a time T20 in synchronization with a system clock signal according to a data read/write request of the CPU 1, a time-period T2 of a double access cycle (or a second bus cycle longer than the first bus cycle) corresponding to two clocks of the system clock signal is allocated for the accessing to the OSD-RAM 4, and the accessing of the CPU 1 to the OSD-RAM 4 is performed in a first half time-period T21 of the time-period T2.

Therefore, when the accessing of the OSD logical circuit 6 to the OSD-RAM 4 performed simultaneously with the accessing of the CPU 1 to the OSD-RAM 4 is desired in the same time-period T2, the change-over switch 8 connects the OSD logical circuit 6 with the OSD-RAM 4 in a second half time-period T22 of the time-period T2 at the 1-wait access mode according to an OSD-RAM read request signal S2 of the OSD logical circuit 6, display data of the OSD-RAM 4 is read out to the OSD logical circuit 6 in the second half time-period T22, a display signal is produced in the OSD logical circuit 6 according to the display data in synchronization with vertical and horizontal synchronization signals Sv and Sh transmitted from the outside, and the display signal is transmitted to the CRT.

Accordingly, because the computer is set to the 1-wait access mode when the CPU 1 accesses to the OSD-RAM 4, even though the accessing of the OSD logical circuit 6 to the OSD-RAM 4 is performed simultaneously with the accessing of the CPU 1 to the OSD-RAM 4, the accessing of the OSD logical circuit 6 to the OSD-RAM 4 and the accessing of the CPU 1 to the OSD-RAM 4 can be respectively performed without any wrong operation of the microcomputer.

Also, in cases where no accessing of the CPU 1 to the OSD-RAM 4 is performed but the accessing of the CPU 1 to the data storing unit 3 is performed, because the microcomputer is set to the no-wait access mode, a time-period of each access of the CPU 1 to the data storing unit 3 can be shortened to one clock of the system clock signal. Therefore, a software processing efficiency can be improved.

In a special case that the access mode value "1" is set in the 1-wait register 5, the OR gate output signal S4 of the high level "1" is always sent to the BIU 2. Therefore, the computer is always set to the 1-wait access mode by the BIU 2, and the accessing of the CPU 1 to the data storing unit 3 or the OSD-RAM 4 and the accessing of the OSD logical circuit 6 to the OSD-RAM 4 are always performed at the 1-wait access mode denoting the double access cycle.

In this embodiment, the OR gate 10 is arranged in the microcomputer. However, the present invention is not limited to the OR gate 10. For example, it is applicable that an AND gate be arranged in place of the OR gate 10 while generally storing an access mode value "1" indicating a no-wait access mode in the 1-wait register 5 and specially storing an access mode value "0" indicating a 1-wait access mode in the 1-wait register 5. In cases where the access mode value "1" indicating the no-wait access mode is stored in the 1-wait register 5, an AND gate output signal of a low level "0" is produced in the AND gate to perform the accessing of the CPU 1 to the data storing unit 3, an AND gate output signal of a high level "1" is produced in the OR gate 10 to perform the accessing of the CPU 1 to the OSD-RAM 4. Therefore, the microcomputer can set to the no-wait access mode for the accessing of the CPU 1 to the data storing unit 3, and the microcomputer can set to the 1-wait access mode for the accessing of the CPU 1 to the OSD-RAM 4.

EMBODIMENT 2

Figure 3:
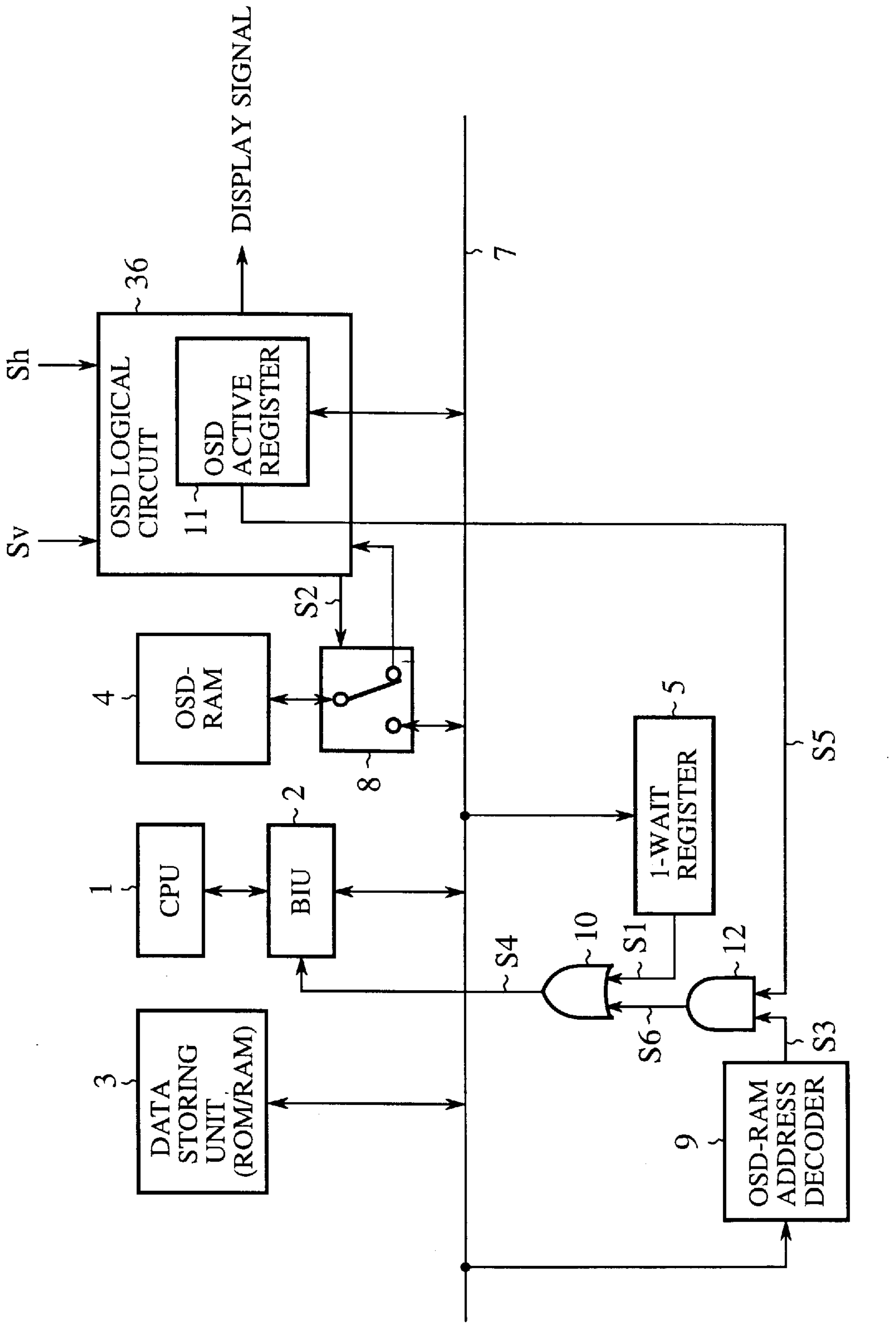
FIG. 3 is a block diagram showing the configuration of a microcomputer having an on-screen display according to a second embodiment of the present invention.

FIG. 3 is a block diagram showing the configuration of a microcomputer having an on-screen display according to a second embodiment of the present invention.

As shown in FIG. 3, a microcomputer comprises the CPU 1, the BIU 2, the data storing unit 3, the OSD-RAM 4, the 1-wait register 5, the address data bus 7, the changing-over switch 8, the OSD-RAM address decoder 9 and the OR gate 10.

In addition, a reference numeral 36 indicates an OSD logical circuit. An OSD-RAM read.request signal S2 of the OSD logical circuit 36 is transmitted to the OSD-RAM 4 to access to the OSD-RAM 4 at the access mode set by the BIU 2 to read out the display data stored in the OSD-RAM 4.

A reference numeral 11 indicates an OSD active register (functioning as a second register. The OSD active register 11 is arranged in the OSD logical circuit 36, a display condition value such as "0" indicating a display non-active condition or "1" indicating a display active condition is written in the OSD active register 11 by the CPU 1 through the address data bus 7.

A reference numeral 12 indicates an AND gate (functioning as a second logical circuit). The AND gate 12 receives the OSD-RAM address decoded signal S3 of the OSD-RAM address decoder 9 and an OSD active register signal S5 set to the display condition value in the OSD active register 11 and performs a well-known AND logic to produce an AND gate output signal S6. The AND gate output signal S6 and the 1-wait signal S1 of the 1-wait register 5 are sent to the OR gate 10 to produce an OR gate output signal S4.

An on-screen display of the microcomputer is composed of the OSD-RAM 4, the changing-over switch 8 and the OSD logical circuit 36 including the OSD active register 11.

In the above configuration, an operation of the microcomputer having the on-screen display is described on condition that the access mode value "0" indicating the no-wait access mode is set in the 1-wait register 5 to output a 1-wait signal S1 of a low level "0" from the 1-wait register 5.

Figure 4:
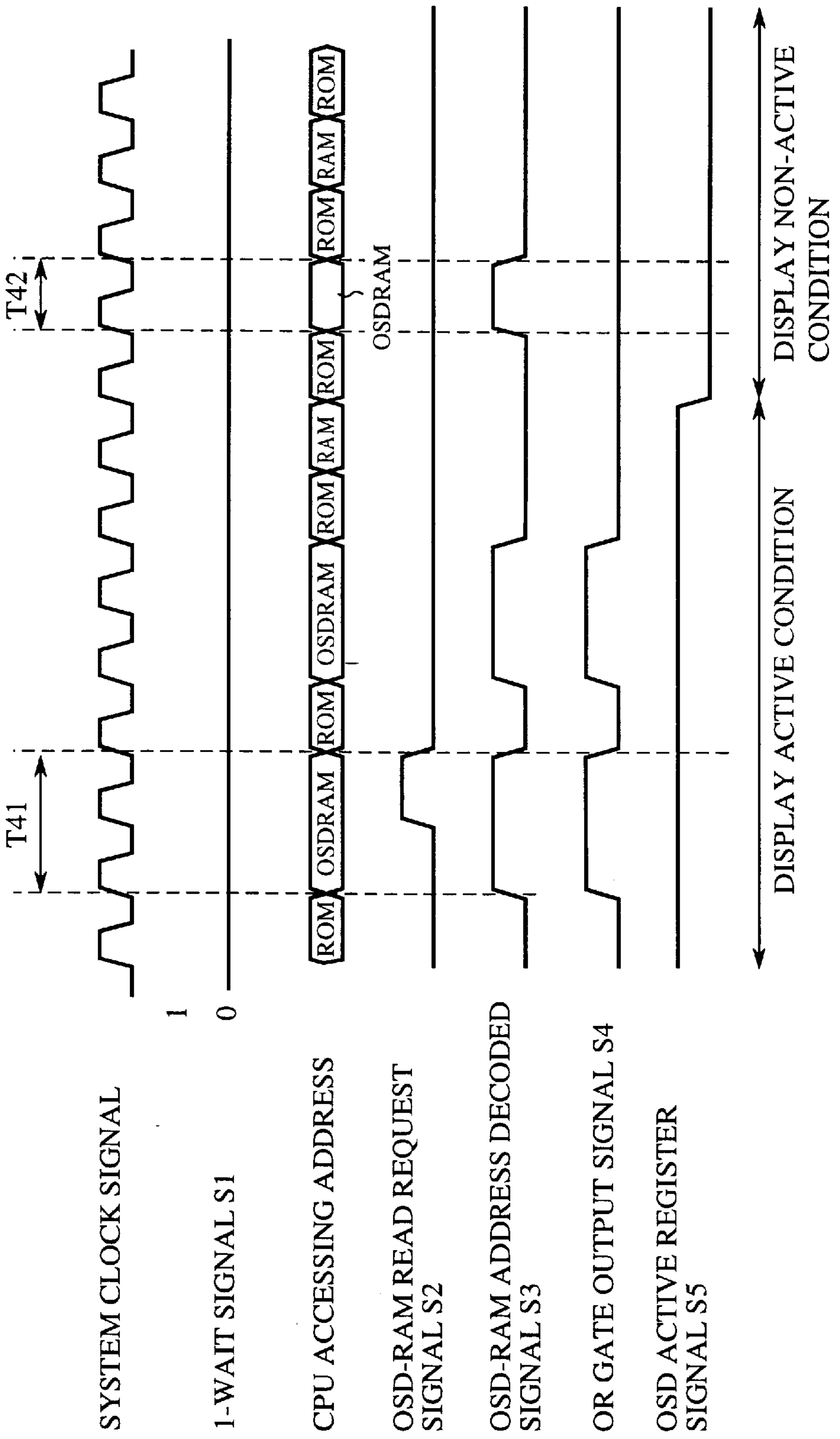
FIG. 4 is a timing chart of signals used in the operation of the microcomputer having the on-screen display shown in FIG. 3.

FIG. 4 is a timing chart of signals used in the operation of the microcomputer having the on-screen display.

In cases where no operation of the on-screen display is desired, a display condition value "0" is written in the OSD active register 11 by the CPU 1 through the address/data bus 7. Therefore, the on-screen display is not operated, and the outputting of a display signal from the OSD logical circuit 36 to the cathode ray tube (not shown) is prohibited. That is, the on-screen display is set to a display non-active condition.

In contrast, in cases where an operation of the on-screen display is desired, a display condition value "1" is written in the OSD active register 11 by the CPU 1 through the address/data bus 7. Therefore, the on-screen display is operated to display a picture on the cathode ray tube, and the outputting of a display signal from the OSD logical circuit 36 to the cathode ray tube is allowed. That is, the on-screen display is set to a display active condition.

In the display active condition of the on-screen display, an OSD active register signal S5 set to the high level "1" is always transmitted from the OSD active register 11 to the AND gate 12. When a data read/write request of the CPU 1 for the OSD-RAM 4 is transmitted to the address/data bus 7, address data indicating the OSD-RAM 4 is decoded in the OSD-RAM address decoder 9 in the same manner as in the first embodiment, and an OSD-RAM address decoded signal S3, which is set to "1" and is produced in the OSD-RAM address decoder 9, is output to the AND gate 12. Because the OSD active register signal S5 and the OSD-RAM address decoded signal S3 are set to "1" together, an AND gate output signal S6 set to "1" is produced in the AND gate 12 and is output to the OR gate 10. Because the AND gate output signal S6 set to "1" is received in the OR gate 10, an OR gate output signal S4 set to "1" is produced in the OR gate 10 and is sent to the BIU 2.

Therefore, the access mode of the microcomputer is set to the 1-wait access mode in the same manner as in the first embodiment. That is, for example, as shown in FIG. 4, in cases where the accessing of the OSD logical circuit 36 to the OSD-RAM 4 performed simultaneously with the accessing of the CPU 1 to the OSD-RAM 4 is desired, the CPU 1 and the OSD logical circuit 36 access to the OSD-RAM 4 in time-division in a time-period T41 corresponding to row clocks of the system clock signal, the change-over switch 8 connects the CPU 1 with the OSD-RAM 4 in a first half time-period of the time-period T41 according to a data read/write request of the CPU 1, and the accessing of the CPU 1 to the OSD-RAM 4 is performed in the first half time-period at the 1-wait access mode denoting the double access cycle. Thereafter, the change-over switch 8 connects the OSD logical circuit 36 with the OSD-RAM 4 in a second half time-period of the time-period T41 at the 1-wait access mode according to an OSD-RAM read request signal S2 of the OSD logical circuit 36, and display data of the OSD-RAM 4 is read out to the OSD logical circuit 36 in the second half time-period.

Also, when a data read/write request of the CPU 1 for the data storing unit 3 is transmitted to the address/data bus 7 in the display active condition of the on-screen display, an OSD-RAM address decoded signal S3 set to "0" is output from the OSD-RAM address decoder 9 to the AND gate 12. Because the OSD-RAM address decoded signal S3 is set to "0", an AND gate output signal S6 set to "0" is produced in the AND gate 12 and is output to the OR gate 10. Because the 1-wait signal S1 of the value "0" and the AND gate output signal S6 of the value "0" are received in the OR gate 10, an OR gate output signal S4 set to "0" is produced in the OR gate 10 and is sent to the BIU 2.

Therefore, the access mode of the microcomputer is set to the non-wait access mode in the same manner as in the first embodiment, and the CPU 1 accesses to the data storing unit 3 at the no-wait access mode to read out or write data from/in the data storing unit 3.

In contrast, in the non-display active condition of the on-screen display, an OSD active register signal S5 set to the low level "0" is transmitted from the OSD active register 11 to the AND gate 12. When a data read/write request of the CPU 1 for the OSD-RAM 4 (or the control circuit 3) is transmitted to the address/data bus 7, address data indicating the OSD-RAM 4 (or the control circuit 3) is decoded in the OSD-RAM address decoder 9 in the same manner as in the first embodiment, and an OSD-RAM address decoded signal S3, which is set to "1" (or "1") and is produced in the OSD-RAM address decoder 9, is output to the AND gate 12. Because the OSD active register signal S5 is set to "0", an AND gate output signal S6 set to "0" is produced in the AND gate 12 and is output to the OR gate 10. Because the AND gate output signal S6 set to "0" and the 1-wait signal S1 set to "0" is received in the OR gate 10, an OR gate output signal S4 set to "0" is produced in the OR gate 10 and is sent to the BIU 2. Therefore, the access mode of the microcomputer is set to the no-wait access mode.

For example, as shown in FIG. 4, the CPU 1 accesses to the OSD-RAM 4 at a time-period T42 corresponding to one clock of the system clock signal. Because the on-screen display of the microcomputer is set to the non-display active condition, no access of the OSD logical circuit 36 to the OSD-RAM 4 is performed, even though the CPU 1 accesses to the OSD-RAM 4 at the no-wait access mode, there is no probability that the CPU 1 and the OSD logical circuit 36 simultaneously access to the OSD-RAM 4, so that no wrong operation of the microcomputer is performed.

Accordingly, because the access mode of the microcomputer is necessarily set to the no-wait access mode in the non-display active condition of the on-screen display, a time-period of each access of the CPU 1 to the data storing unit 3 or the OSD-RAM 4 can be shortened to one clock of the system clock signal. Therefore, a software processing efficiency can be moreover improved as compared with that of the microcomputer according to the first embodiment.

Also, because the computer is set to the 1-wait access mode when the CPU 1 accesses to the OSD-RAM 4 in the display active condition of the on-screen display, even though the accessing of the OSD logical circuit 36 to the OSD-RAM 4 is performed simultaneously with the accessing of the CPU 1 to the OSD-RAM 4, the accessing of the OSD logical circuit 36 to the OSD-RAM 4 and the accessing of the CPU 1 to the OSD-RAM 4 can be respectively performed without any wrong operation of the microcomputer in the same manner as in the first embodiment.

Also, in cases where no accessing of the CPU 1 to the OSD-RAM 4 is performed but the accessing of the CPU 1 to the data storing unit 3 is performed in the display active condition of the on-screen display, because the microcomputer is set to the no-wait access mode, a time-period of each access of the CPU 1 to the data storing unit 3 can be shortened to one clock of the system clock signal. Therefore, a software processing efficiency can be improved in the same manner as in the first embodiment.

In this embodiment, the OR gate 10 is arranged in the microcomputer. However, the present invention is not limited to the OR gate 10. For example, in the same manner as in the first embodiment, it is applicable that an AND gate be arranged in place of the OR gate 10 while storing an access mode value "1" indicating the no-wait access mode in the 1-wait register 5.

EMBODIMENT 3

Figure 5:
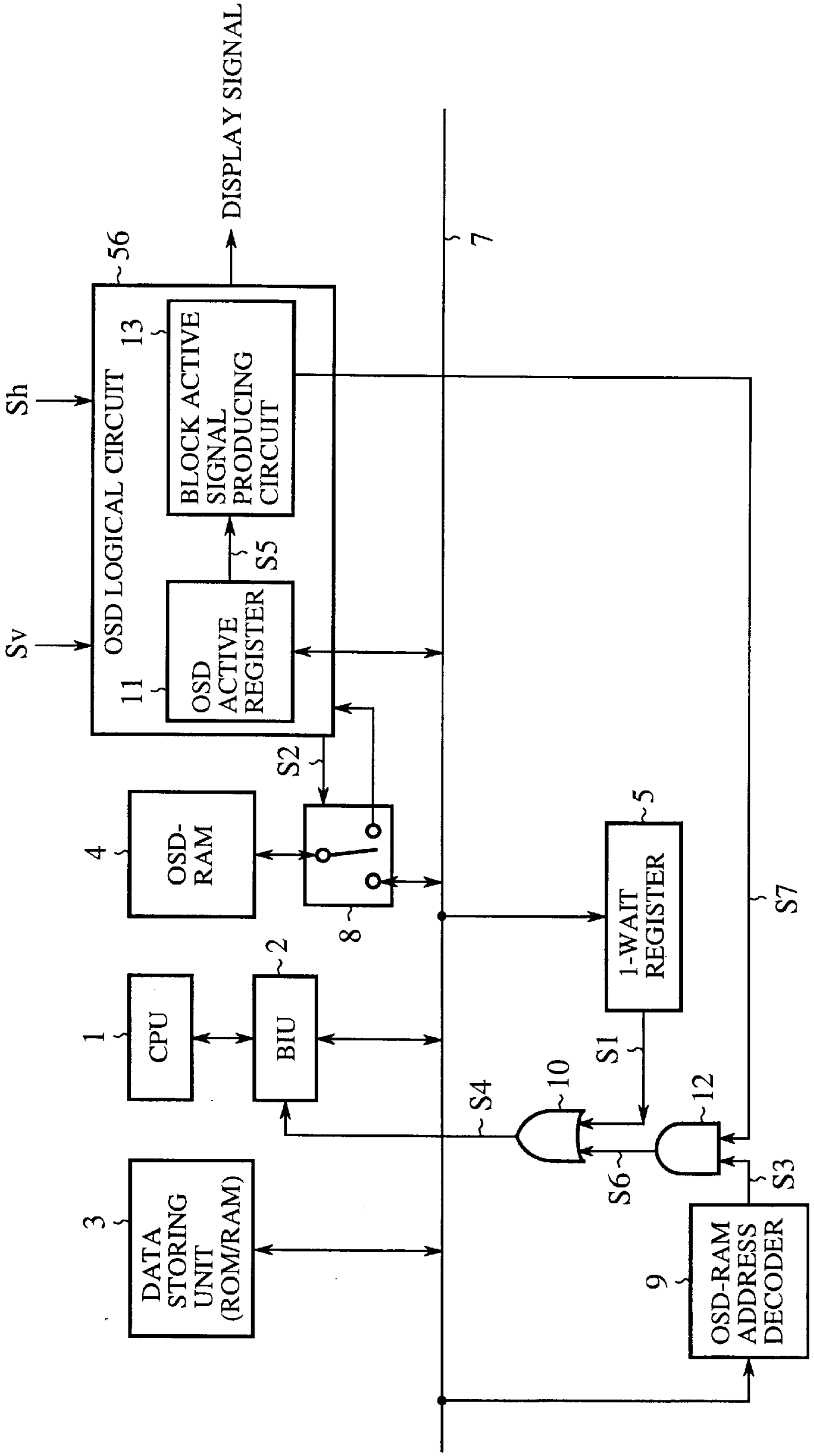
FIG. 5 is a block diagram showing the configuration of a microcomputer having an on-screen display according to a third embodiment of the present invention.

FIG. 5 is a block diagram showing the configuration of a microcomputer having an on-screen display according to a third embodiment of the present invention.

As shown in FIG. 5, a microcomputer comprises the CPU 1, the BIU 2, the data storing unit 3, the OSD-RAM 4, the 1-wait register 5, the address data bus 7, the changing-over switch 8, the OSD-RAM address decoder 9, the OR gate 10, the OSD active register 11 and the AND gate 12.

In addition, a reference numeral 56 indicates an OSD logical circuit including the OSD active register 11. In cases where the OSD logical circuit 56 is set to the display active condition by the CPU 1, the OSD logical circuit 56 sets a display time-period, in which a block of display data is displayed on a cathode ray tube of an on-screen display, and transmits an OSD-RAM read request signal S2 in the display time-period to the OSD-RAM 4 to read out the block of display data stored in the OSD-RAM 4 and to display the block of display data on the cathode ray tube in the display time-period.

A reference numeral 13 indicates a block active signal producing circuit arranged in the OSD logical circuit 56. The block active signal producing circuit 13 receives an OSD active register signal S5 set to the display condition value from the OSD active register 11, produces a block active signal S7 set to a high level "1" in a display time-period in which a block of display data is displayed on a cathode ray tube of an on-screen display of the microcomputer in a display active condition of the on-screen display indicated by the OSD active register signal S5 and outputs the block active signal S7 to the AND gate 12.

The on-screen display of the microcomputer is composed of the OSD-RAM 4, the changing-over switch 8 and the OSD logical circuit 56 including the OSD active register 11 and the block active signal producing circuit 13.

In the above configuration, an operation of the microcomputer having the on-screen display is described on condition that the access mode value "0" indicating the no-wait access mode is set in the 1-wait register 5 to output a 1-wait signal S1 of a low level "0" from the 1-wait register 5 to the OR gate 10.

Figure 6:
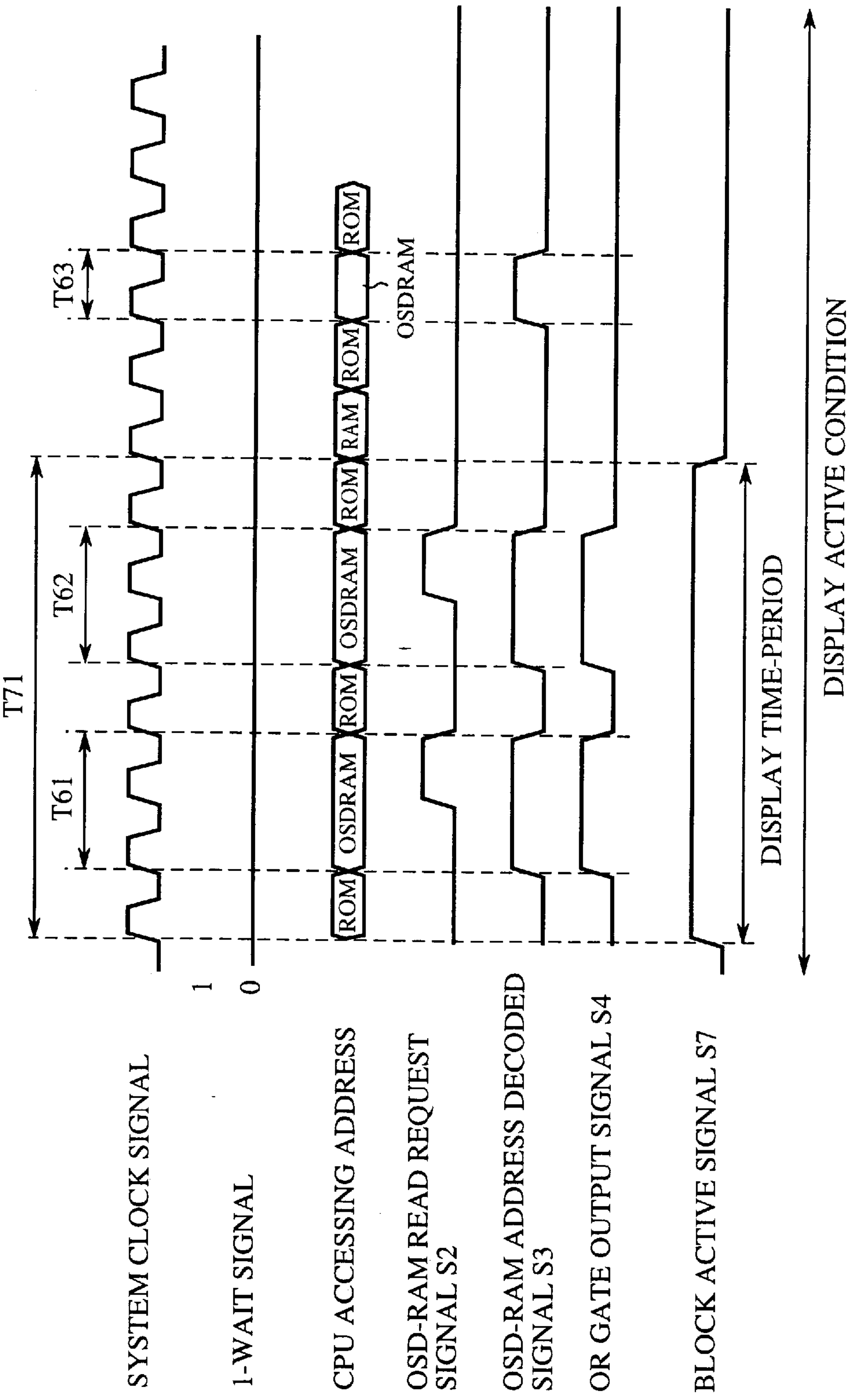
FIG. 6 is a timing chart of signals used in the operation of the microcomputer having the on-screen display shown in FIG. 5.
Figure 7:
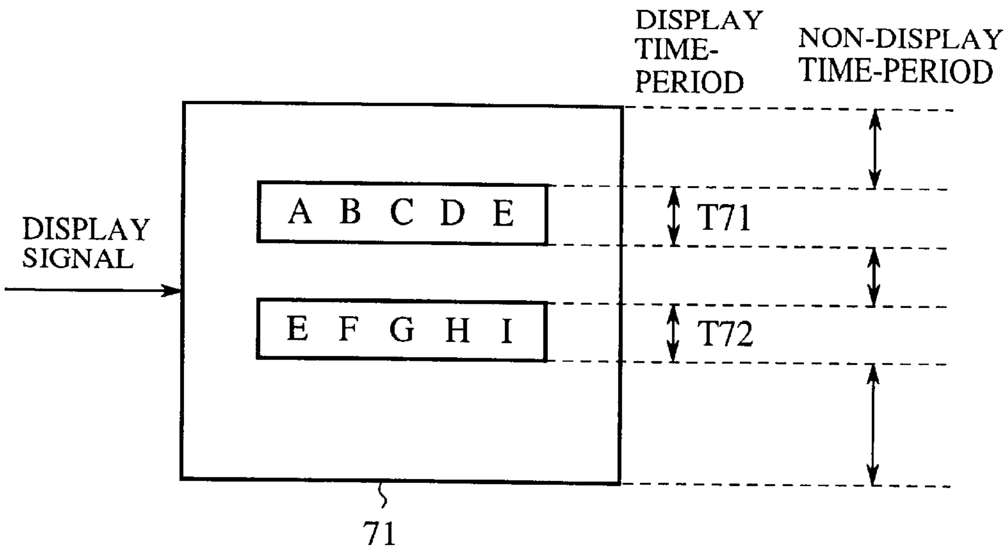
FIG. 7 is an explanatory diagram showing a display time-period in which each block of display data is displayed on a cathode ray tube of the on-screen display shown in FIG. 5.
Figure 11:
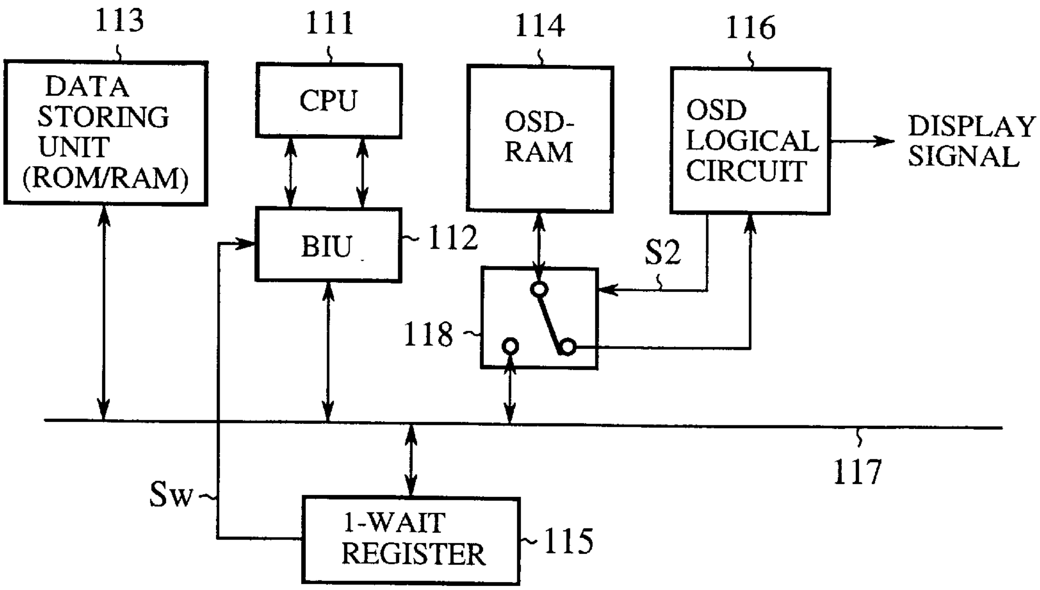
FIG.11 (PRIOR ART)
FIG. 11 is a block diagram showing the configuration of a conventional microcomputer having an on-screen display.

FIG. 6 is a timing chart of signals used in the operation of the microcomputer having the on-screen display, and FIG. 7 is an explanatory diagram showing a display time-period in which each block of display data is displayed on a cathode ray tube of the on-screen display.

A display condition value is written in the OSD active register 11 by the CPU 1 through the address/data bus 7, and an OSD active register signal S5 set to the display condition value is sent from the OSD active register 11 to the block active signal producing circuit 13.

In cases where a display condition value "1" is written in the OSD active register 11, the on-screen display is set to the display active condition in the same manner as in the second embodiment, and an OSD active register signal S5 set to the value "1" is sent to the block active signal producing circuit 13. Therefore, a display time-period in which a block of display data is displayed on a cathode ray tube of the on-screen display is set in the OSD logical circuit 56 for each block of display data. For example, as shown in FIG. 7, a display time-period T71, in which a block of display data "ABCDE" is displayed on a cathode ray tube 71 of the on-screen display, and a display time-period T72, in which a block of display data "EFGHI" is displayed on the cathode ray tube 71, are set in the OSD logical circuit 56. In this case, a picture display time-period, in which a picture is displayed on the cathode ray tube 71 without displaying any block of display data, is not set as a display time-period.

Thereafter, as shown in FIG. 6, a block active signal S7, in which a level corresponding to each display time-period set in the OSD logical circuit 56 is set to the high level "1", is produced in the block active signal producing circuit 13 and is transmitted to the AND gate 10. Therefore, the block active signal S7 indicates each display time-period.

Figure 8:
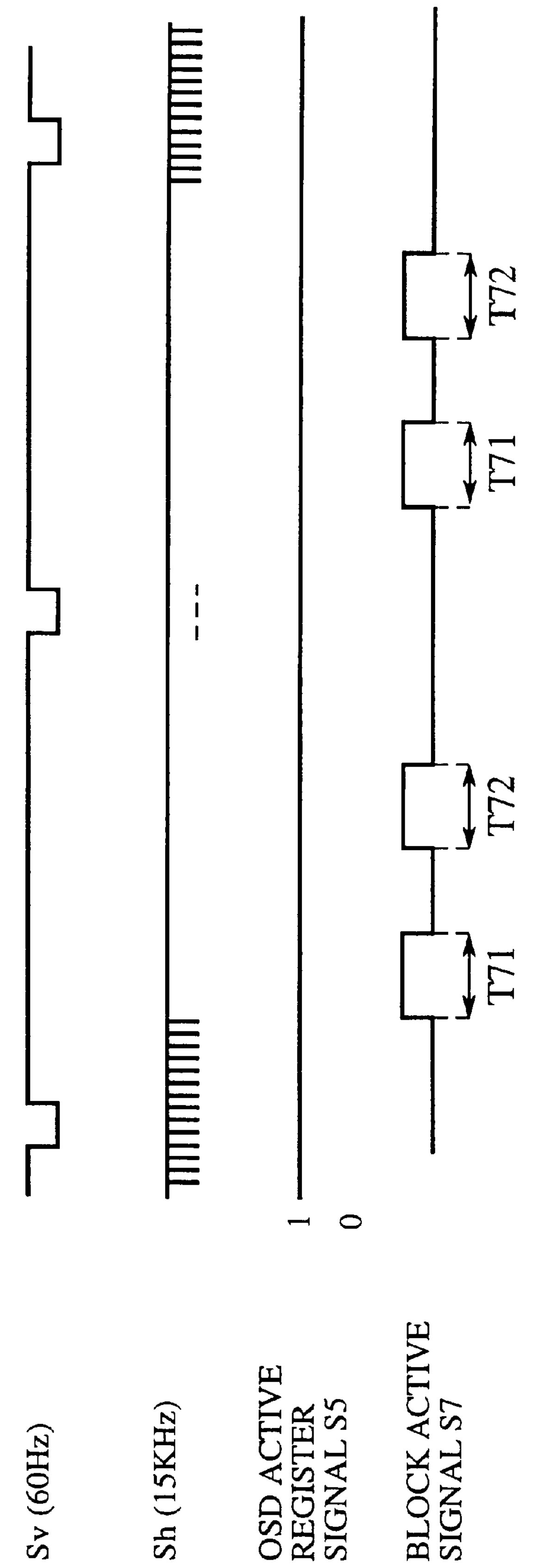
FIG. 8 is a timing chart of a block active signal and vertical and horizontal synchronization signals.

FIG. 8 is a timing chart of the block active signal S7 and vertical and horizontal synchronization signals Sv and Sh.

In general, a frequency of the system clock signal is a ten and several MHz, a frequency of the horizontal synchronization signal Sh is about 15 KHz, and the vertical synchronization signal Sv is about 60 Hz. As shown in FIG. 8, when the OSD active register signal S5 is set to "1" to set the on-screen display to the display active condition, the block active signal S7 is produced in synchronization with the vertical and horizontal synchronization signals Sv and Sh.

Thereafter, in cases where the OSD-RAM address decoded signal S3 is set to "1" in an OSD accessing time-period the AND gate outputting signal S6 is set to "1" in an because the accessing of the CPU 1 to the OSD-RAM 4 is desired, access-display overlap time-period in which the OSD accessing time-period overlaps with one display time-period indicated by the block active signal S7, the OR gate output signal S4 is set to "1" in each access-display overlap time-period, and the microcomputer is set to the 1-wait access mode by the BIU 2 in each access-display overlap time-period. For example, as shown in FIG. 6, a first time-period T61 and a second time-period T62 respectively correspond to one access-display overlap time-period. Thereafter, the CPU 1 accesses to the OSD-RAM 4 in a first half period of each access-display overlap time-period (represented by T61, T62). In cases where the accessing of the OSD logic circuit 56 to the OSD-RAM 4 is desired in one access-display overlap time-period, the OSD logic circuit 56 accesses to the OSD-RAM 4 in a second half period of the access-display overlap time-period in the same manner as in the first and second embodiments.

Accordingly, even though the on-screen display is operated in the display active condition, because the microcomputer is set to the 1-wait access mode in only a case where the time-period of the accessing of the CPU 1 to the OSD-RAM 4 overlaps with the display time-period of the display data shorter than the time-period of the display active condition, a software processing efficiency can be moreover improved as compared with that of the microcomputer according to the second embodiment. In detail, as shown in FIG. 6, even though the OSD-RAM address decoded signal S3 is set to "1" in an OSD accessing time-period T63, because the block active signal S7 is set to "0" in a non-display time-period including the OSD accessing time-period T63 in which no accessing of the OSD logical circuit 56 to the OSD-RAM 4 is performed, the AND gate outputting signal S6 is set to "0", the OR gate output signal S4 is set to "0", and the microcomputer is set to the no-wait access mode by the BIU 2 in the OSD accessing time-period T63.

Therefore, even though the on-screen display is operated in the display active condition, because no block of display data to be displayed on the cathode ray tube 71 is read out from the OSD-RAM 4 to the OSD logical circuit 56 in the OSD accessing time-period T63, the CPU 1 can access to the OSD-RAM 4 at the no-wait access mode without any wrong operation of the microcomputer, and a time-period of each access of the CPU 1 to the data storing unit 3 or the OSD-RAM 4 can be shortened to one clock of the system clock signal.

In cases where a display condition value "0" is written in the OSD active register 11 to set the on-screen display to the display non-active condition, the block active signal S7 is always set to "0", so that the microcomputer is set to the no-wait access mode by the BIU 2 in the same manner as in the second embodiment. Therefore, the CPU 1 can access to the data storing unit 3 or the OSD-RAM 4 at the no-wait access mode in the same manner as in the second embodiment.

In this embodiment, the OR gate 10 is arranged in the microcomputer. However, the present invention is not limited to the OR gate 10. For example, in the same manner as in the first embodiment, it is applicable that an AND gate be arranged in place of the OR gate 10 while storing an access mode value "1" indicating the no-wait access mode in the 1-wait register 5.

EMBODIMENT 4

Figure 9:
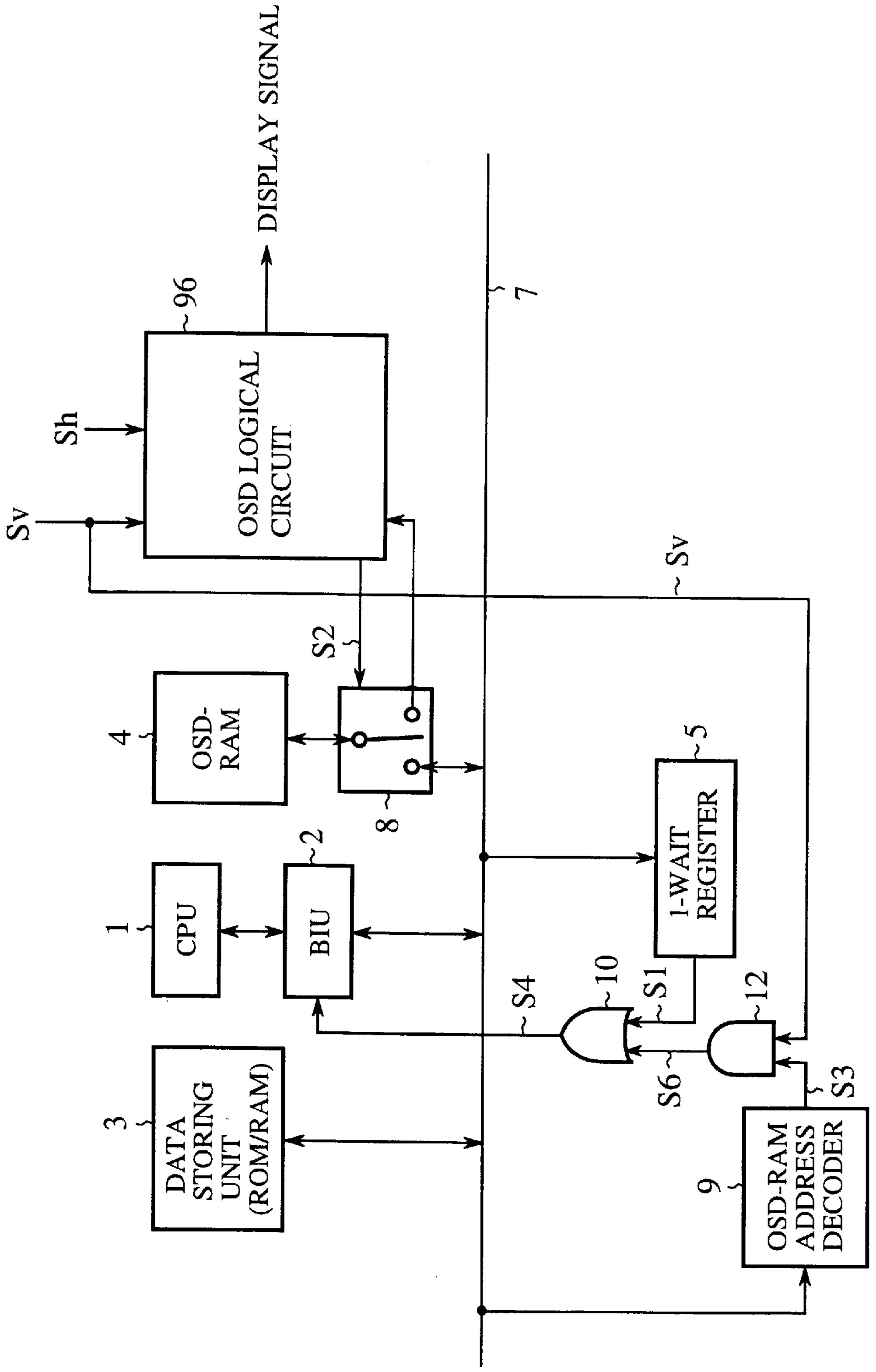
FIG. 9 is a block diagram showing the configuration of a microcomputer having an on-screen display according to a fourth embodiment of the present invention.

FIG. 9 is a block diagram showing the configuration of a microcomputer having an on-screen display according to a fourth embodiment of the present invention.

In this embodiment, a vertical synchronization signal Sv is set to a low active condition.

As shown in FIG. 9, a microcomputer comprises the CPU 1, the BIU 2, the data storing unit 3, the OSD-RAM 4, the 1-wait register 5, the address data bus 7, the changing-over switch 8, the OSD-RAM address decoder 9, the OR gate 10 and the AND gate 12.

In addition, a reference numeral 96 indicates an OSD logical circuit, and an on-screen display of the microcomputer is composed of the, OSD-RAM 4, the changing-over switch 8 and the OSD logical circuit 96. The OSD logical circuit 96 is allowed to access to the OSD-RAM 4 when a vertical synchronization signal Sv set to a high level (H) "1" is input to the OSD logical circuit 96, and the OSD logical circuit 96 does not access to the OSD-RAM 4 when the vertical synchronization signal Sv set to a low level (L) "0" is input to the OSD logical circuit 96.

The vertical synchronization signal Sv is input to the AND gate 12 with an OSD-RAM address decoded signal S3 of the OSD-RAM address decoder 9.

In the above configuration, an operation of the microcomputer having the on-screen display is described on condition that the access mode value "0" indicating the no-wait access mode is set in the 1-wait register 5 to output a 1-wait signal S1 of a low level "0" from the 1-wait register 5 to the OR gate 10.

Figure 10:
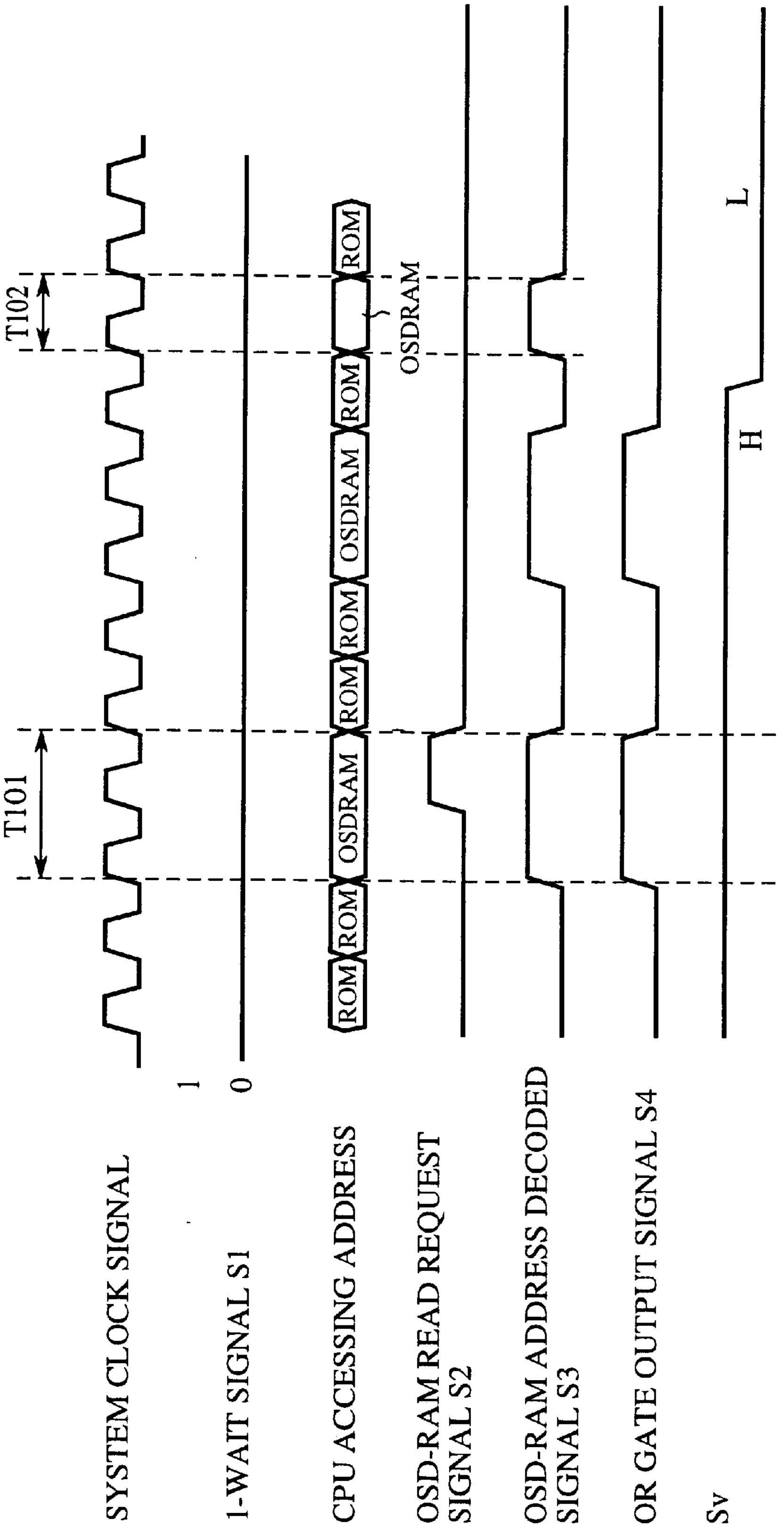
FIG. 10 is a timing chart of signals used in the operation of the microcomputer having the on-screen display shown in FIG. 9.
Figure 12:
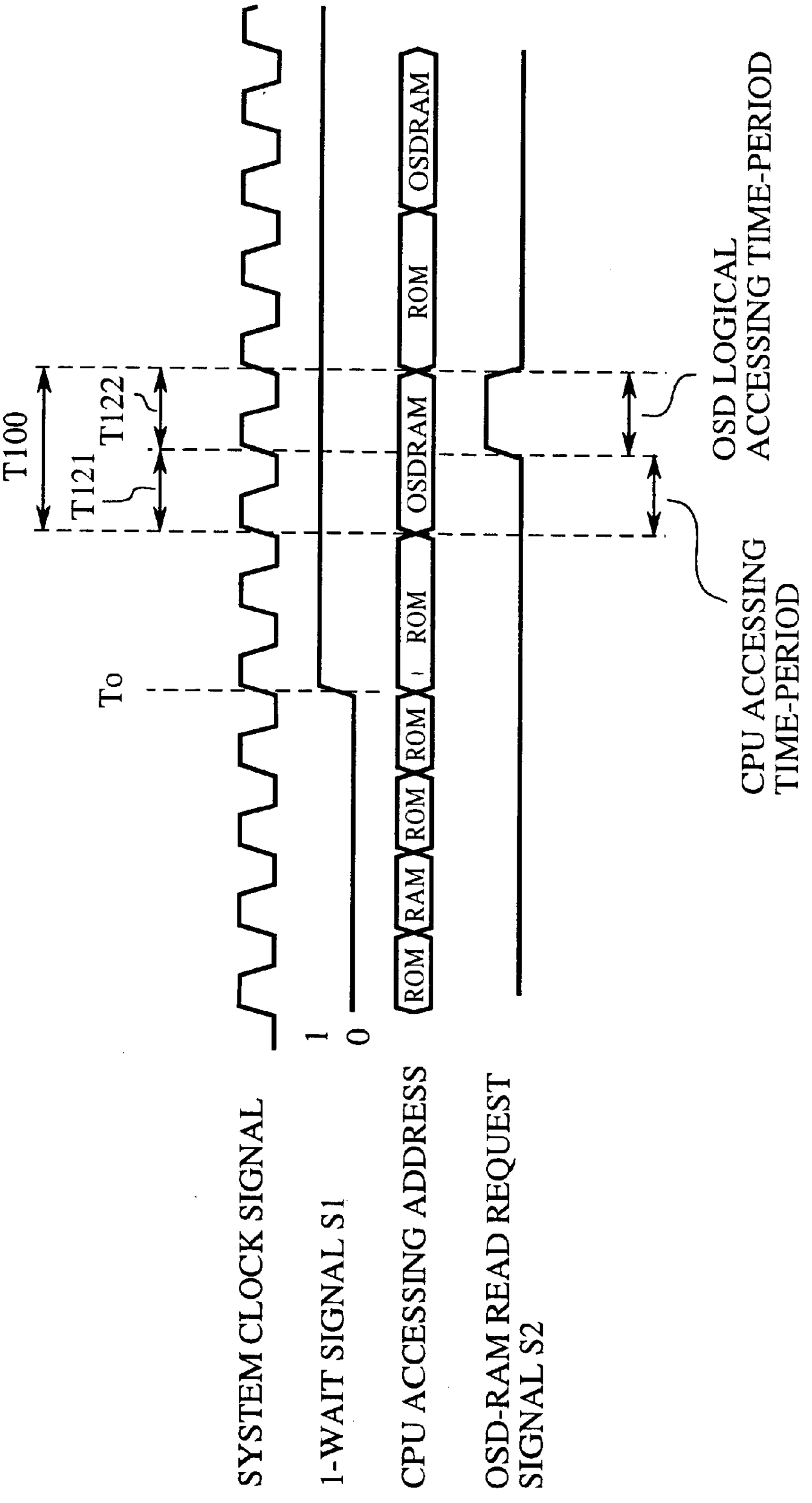
FIG.12 (PRIOR ART)
FIG. 12 is a timing chart of signals used in the operation of the conventional microcomputer having the on-screen display shown in FIG. 11.

FIG. 10 is a timing chart of signals used in the operation of the microcomputer having the on-screen display.

A picture is displayed on a cathode ray tube (not shown) of the on-screen display according to a vertical synchronization signal Sv set to a high level "1" and a horizontal synchronization signal Sh. Therefore, because the vertical synchronization signal Sv set to "1" indicates that the on-screen display is set to a display possible condition, in cases where the vertical synchronization signal Sv set to "1" is input to the OSD logical circuit 96 from the outside, the OSD logical circuit 96 is allowed to access to the OSD-RAM 4 and to transmit display data to the cathode ray tube. Also, because the vertical synchronization signal Sv set to "0" indicates that the on-screen display is set to a display impossible condition, in cases where the vertical synchronization signal Sv set to "0" is input to the OSD logical circuit 96 from the outside, the OSD logical circuit 96 does not perform the accessing to the OSD-RAM 4 or the transmission of display data to the cathode ray tube.

In cases where the on-screen display is set to the display possible condition, the vertical synchronization signal Sv set to "1" is transmitted to the AND gate 10. Therefore, when the CPU 1 desires to access to the OSD-RAM 4, because an OSD-RAM address decoded signal S3 set to "1" is output from the OSD-RAM address decoder 9 to the AND gate 12, the microcomputer is set to the 1-wait access mode by the BIU 2 in the same manner as in the second and third embodiment. Therefore, for example, as shown in FIG. 10, the CPU 1 accesses to the OSD-RAM 4 at the 1-wait access mode in the first half of a time-period T101 corresponding to two clocks of the system clock signal. Also, in cases where the accessing of the OSD logical circuit 96 to the OSD-RAM 4 is performed simultaneously with the accessing of the CPU 1 to the OSD-RAM 4 because the OSD logical circuit 96 receiving the vertical synchronization signal Sv set to "1" is allowed to access to the OSD-RAM 4, the OSD logical circuit 96 accesses to the OSD-RAM 4 at the 1-wait access mode in the second half of a time-period T101.

In contrast, in cases where the on-screen display is set to the display impossible condition, the vertical synchronization signal Sv set to "0" is transmitted to the AND gate 10. Therefore, when the CPU 1 desires to access to the OSD-RAM 4 (or the data storing unit 3), because the AND gate 10 outputs an AND gate output signal S6 set to "0" regardless of the level of the OSD-RAM address decoded signal S3 output from the OSD-RAM address decoder 9 to the AND gate 12, the microcomputer is set to the no-wait access mode by the BIU 2 in the same manner as in the second and third embodiment. Therefore, for example, as shown in FIG. 10, the CPU 1 accesses to the OSD-RAM 4 at the no-wait access mode in a time-period T102 corresponding to one clock of the system clock signal. In this case, the accessing of the OSD logical circuit 96 to the OSD-RAM 4 is not performed because the on-screen display is set to the display impossible condition, so that there is no probability that a wrong operation of the microcomputer is performed.

Accordingly, in cases where the on-screen display is set to the display possible condition, because the microcomputer is set to the 1-wait access mode when the CPU 1 desires to access to the OSD-RAM 4, a wrong operation of the microcomputer can be prevented.

Also, in cases where the on-screen display is set to the display impossible condition, because the microcomputer is always set to the no-wait access mode regardless of whether the CPU 1 accesses to the data storing unit 3 or the OSD-RAM 4, a time-period of each access of the CPU 1 to the data storing unit 3 or the OSD-RAM 4 can be shortened to one clock of the system clock signal in the same manner as in the second embodiment. Therefore, a software processing efficiency can be improved.

Also, because the OSD active register 11 required in the second embodiment is not required in this embodiment, the microcomputer can be simplified.

In this embodiment, the OR gate 10 is arranged in the microcomputer. However, the present invention is not limited to the OR gate 10. For example, in the same manner as in the first embodiment, it is applicable that an AND gate be arranged in place of the OR gate 10 while storing an access mode value "1" indicating the no-wait access mode in the 1-wait register 5.

What is claimed is:

1. A microcomputer having an on-screen display, comprising:

a first register for registering an access mode value indicating a first access mode corresponding to a first bus cycle or a second access mode corresponding to a second bus cycle longer than the first bus cycle;

a first storing circuit for storing first data;

a display data storing circuit for storing display data;

a first control unit for outputting address data of the first storing circuit or address data of the display data storing circuit to access the first storing circuit or the display data storing circuit and to process the first data or the display data;

an address decoder for decoding the address data output by the first control unit to identify whether the address data indicates the first storing circuit or the display data storing circuit, outputting a first address value when the address data indicates the first storing circuit, and outputting a second address value when the address data indicates the display data storing circuit;

a first logical circuit, connected with the first register and the address decoder, for producing a first logical value indicating the second access mode when the first register registers the access mode value indicating the first access mode and the second address value indicating the display data storing circuit is output by the address decoder;

a picture display logical circuit for accessing the display data storing circuit to display the display data stored in the display data storing circuit on the on-screen display; and a bus interface unit for receiving the first logical value from the first logical circuit, setting the access mode of the first control unit to the second access mode according to the first logical value to make the first control unit access the display data storing circuit in a first half of the second bus cycle and to make the picture display logical circuit access the display data storing circuit in a second half of the second bus cycle.

2. A microcomputer having an on-screen display according to claim 1, wherein the picture display logical circuit comprises a second register for registering a display condition value indicating a display active condition or a display condition value indicating a display non-active condition, the microcomputer further comprises a second logical circuit for receiving the first address value or the second address data from the address decoder, receiving the display condition value from the second register, performing a logical calculation according to the first address value or the second address data and the display condition value, producing a second logical value from the first address value or the second address data and the display condition value, and outputting the second logical value to the first logical circuit, the second logical circuit outputs the second logical value by receiving the second address value indicating the display data storing circuit from the address decoder and receiving the display condition value indicating the display active condition from the second register, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access the display data storing circuit in the first half of the second bus cycle and to make the picture display logical circuit access the display data storing circuit in the second half of the second bus cycle.

3. A microcomputer having an on-screen display according to claim 1, wherein the picture display logical circuit comprises a second register for registering a display condition value indicating a display active condition or a display condition value indicating a display non-active condition; and a block active signal producing circuit, connected with the second register, for producing a block active signal indicating a block display time-period in the on-screen display when the display condition value indicating the display active condition is registered in the second register, the microcomputer further comprises a second logical circuit for receiving the first address value or the second address data from the address decoder, receiving the block active signal from the block active signal producing circuit, performing a logical calculation according to the first address value or the second address data and the block active signal, producing a second logical value from the first address value or the second address data and the block active signal, and outputting the second logical value to the first logical circuit, the second logical circuit outputs the second logical value by receiving the second address value indicating the display data storing circuit from the address decoder and receiving the block active signal indicating the block display time-period from the block active signal producing circuit, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access the display data storing circuit in the first half of the second bus cycle of the block display time-period and to make the picture display logical circuit access the display data storing circuit in the second half of the second bus cycle of the block display time-period.

4. A microcomputer having an on-screen display according to claim 1, further comprises a second logical circuit for receiving the first address value or the second address data from the address decoder, receiving a vertical synchronization signal, performing a logical calculation according to the first address value or the second address data and the vertical synchronization signal, producing a second logical value from the first address value or the second address data and the vertical synchronization signal, and outputting the second logical value to the first logical circuit, the second logical circuit outputs the second logical value by receiving the second address value indicating the display data storing circuit from the address decoder and receiving the display condition value indicating the display active condition from the second register, the first logical circuit outputs the first logical value indicating the second access mode by receiving the access mode value indicating the first access mode from the first register and receiving the second logical value from the second logical circuit, and the bus interface unit sets the access mode of the first control unit to the second access mode according to the first logical value of the first logical circuit to make the first control unit access the display data storing circuit in the first half of the second bus cycle and to make the picture display logical circuit access the display data storing circuit in the second half of the second bus cycle.

5. A microcomputer according to claim 1, further comprising:

a change-over switch for connecting the first control unit with the display data storing circuit in the first half of the second bus cycle and connecting the picture display logical circuit with the display data storing circuit in the second half of the second bus cycle according to a request of the display data storing circuit, when the access mode of the first control unit is set to the second access mode by the bus interface unit which receives the first logical value from the first logical circuit.

6. A microcomputer according to claim 1, wherein the first logical circuit is an OR gate, and the first logical value indicating the second access mode is "1" indicating a high level.

7. A microcomputer according to claim 2, wherein the first logical circuit is an OR gate, the first logical value indicating the second access mode is "1" indicating a high level, and the second logical circuit is an AND circuit.

8. A microcomputer according to claim 3, wherein the first logical circuit is an OR gate, the first logical value indicating the second access mode is "1" indicating a high level, and the second logical circuit is an AND circuit.

9. A microcomputer according to claim 4, wherein the first logical circuit is an OR gate, the first logical value indicating the second access mode is "1" indicating a high level, and the second logical circuit is an AND circuit.

10. A microcomputer according to claim 5, wherein the first logical circuit is an OR gate, the first logical value indicating the second access mode is "1" indicating a high level, and the second logical circuit is an AND circuit.

* * * * *